United States Patent
Kameyama

(10) Patent No.: US 10,075,061 B2
(45) Date of Patent: Sep. 11, 2018

(54) POWER SUPPLY DEVICE WITH EXCESS CURRENT PROTECTION

(71) Applicant: FDK CORPORATION, Minato-ku, Tokyo (JP)

(72) Inventor: Shigeru Kameyama, Tokyo (JP)

(73) Assignee: FDK CORPORATION, Tokyo (JP)

(*) Notice: Subject to any disclaimer, the term of this patent is extended or adjusted under 35 U.S.C. 154(b) by 0 days.

(21) Appl. No.: 15/789,392

(22) Filed: Oct. 20, 2017

(65) Prior Publication Data

US 2018/0041112 A1   Feb. 8, 2018

Related U.S. Application Data

(63) Continuation of application No. PCT/JP2016/062234, filed on Apr. 18, 2016.

(30) Foreign Application Priority Data

Apr. 20, 2015  (JP) .................................. 2015-085725

(51) Int. Cl.
  *H02M 1/32*  (2007.01)
  *H02H 9/02*  (2006.01)
  *H02M 7/217*  (2006.01)

(52) U.S. Cl.
  CPC .............. *H02M 1/32* (2013.01); *H02H 9/02* (2013.01); *H02M 7/217* (2013.01)

(58) Field of Classification Search
  CPC ........ H02M 1/32; H02M 7/217; H02M 3/156; H02H 9/02; G05F 1/10; G05F 1/40
  See application file for complete search history.

(56) References Cited

U.S. PATENT DOCUMENTS

2012/0133345 A1* 5/2012 Tai .................... H02M 3/156
                                                                 323/282

FOREIGN PATENT DOCUMENTS

| JP | 2001119933 A | 4/2001 |
| JP | 2001345688 A | 12/2001 |
| JP | 2005323413 A | 11/2005 |
| JP | 2011160517 A | 8/2011 |

OTHER PUBLICATIONS

International Search Report corresponding to Application No. PCT/JP2016/062234; dated Jun. 28, 2016.
Written Opinion of the International Searching Authority and International Preliminary Report on Patentability corresponding to Application No. PCT/JP2016/062234; dated Jun. 28, 2016.

* cited by examiner

*Primary Examiner* — Emily P Pham
(74) *Attorney, Agent, or Firm* — Cantor Colburn LLP

(57) ABSTRACT

A first excess current protector directs a controller to limit an output current of a regulator when a current value detected by a current detector exceeds a first preset current value set to be higher than a rated current value of a power supply device. A second excess current protector directs the controller to limit the output current of the regulator when an average value of the current value detected by the current detector over a predetermined period of time exceeds a second preset current value set to correspond to the rated current value. A third excess current protector directs the controller to limit the output current of the regulator when the current value detected by the current detector exceeds a third preset current value set to be lower than the second preset current value.

5 Claims, 5 Drawing Sheets

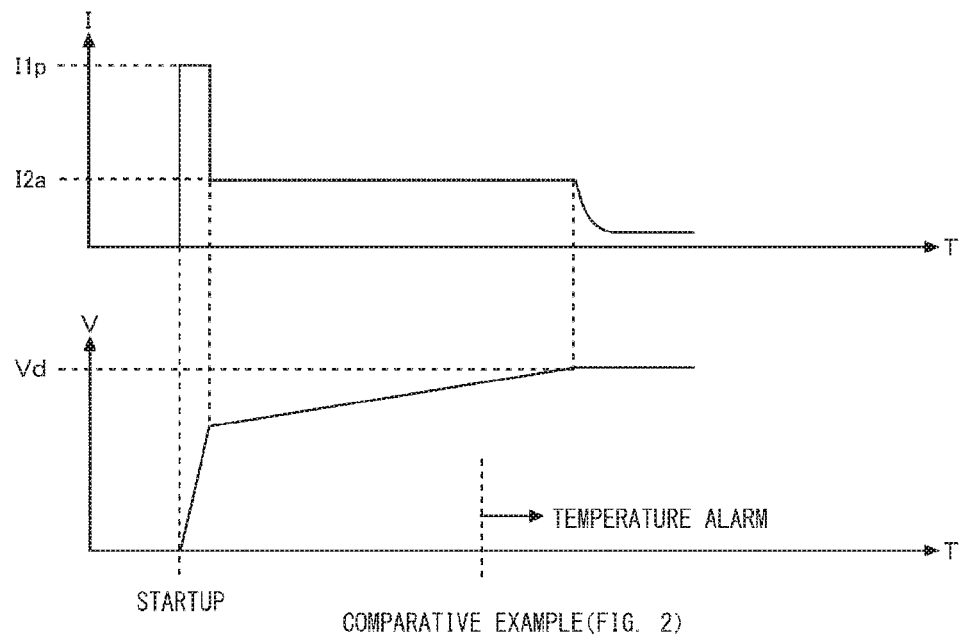
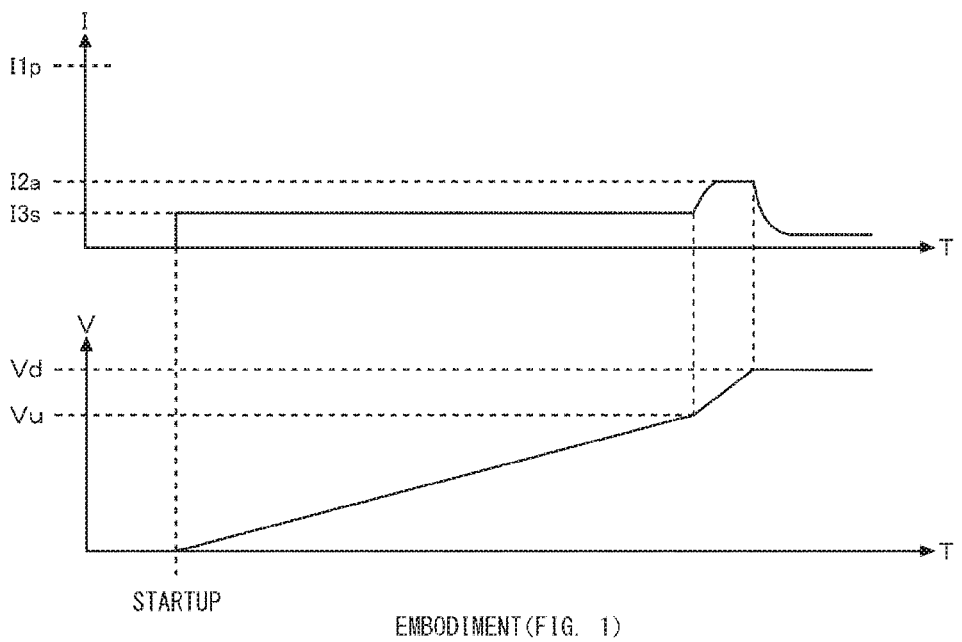

POWER SUPPLY DEVICE WITH EXCESS CURRENT PROTECTION

CROSS REFERENCES TO RELATED APPLICATIONS

The present invention is a bypass continuation under 35 U.S.C. § 120 of PCT/JP2016/062234, filed Apr. 18, 2016, which is incorporated herein reference and which claimed priority to Japanese Patent Application 2015-085725 filed Apr. 20, 2015. The present application likewise claims priority under 35 U.S.C. § 119 to Japanese Application No. 2015-085725, filed Apr. 20, 2015, the entire contents of which being is also incorporated herein by reference.

BACKGROUND OF THE INVENTION

1. Field of the Invention

The present invention relates to power supply devices with excess current protection for supplying electric power to a load of a motor, etc.

2. Description of the Related Art

A load of a motor requires a large electric power and the peak power thereof is larger than other commonly known loads. A capacitor of a large capacitance is often connected in parallel to a motor in order to secure an instantaneous power when the motor is started. The capacitor is discharged when the motor is started and is tasked to increase a starting torque of the motor.

DC motors are often driven by a pulse current. Power supply devices capable of outputting a pulse current are generally equipped with excess current protection for peak power and excess current protection for average power. The former is for controlling the output when a peak current is detected, and the latter is for controlling the output when the average current over a unit period exceeds the rated current. So long as the average current over a unit period does not exceed the rated current, the latter excess current protection is not activated even when a current exceeding the rated current flows instantaneously.

Patent document 1 discloses a power supply device in which two-stage excess current detection values can be set. In the power supply device, a first excess current detection value having a relatively small value is set as an excess current detection value, when the output voltage is abnormal due to a short circuit in a load, etc. and when a signal in a steady state is output (i.e., at a time other than startup). At startup, a second excess current detection value having a relatively large value is set as an excess current detection value. When the output voltage is normal (i.e., when the output voltage rises to a constant voltage or higher and there are no abnormalities such as a short circuit in the load), the second excess current value is set.

[patent document 1] JP2005-323413

When a capacitor of a large capacitance is connected in parallel to the load as described above, a large current flows from the power supply device to the capacitor at startup. In this process, the excess current protection for peak power is activated. Subsequently, the excess current protection for average power is activated so that the voltage rises, subject to the restriction by the excess current protection for average power. In either condition, the device outputs rated power or higher so that a load such as thermal stress is large.

SUMMARY OF THE INVENTION

In this background, a general purpose of the present invention is to provide a technology for reducing stress at startup in a power supply device that supplies power to a load of a large capacitance.

The power supply device with excess current protection according to one embodiment of the present invention comprises: a regulator that supplies power to a load; a controller that controls a switching element included in the regulator; a current detector that detects an output current of the regulator; a first excess current protector that directs the controller to limit the output current of the regulator when the current value detected by the current detector exceeds a first preset current value set to be higher than a rated current value of the power supply device; a second excess current protector that directs the controller to limit the output current of the regulator when an average value of the current value detected by the current detector over a predetermined period of time exceeds a second preset current value set to correspond to the rated current value; and a third excess current protector that directs the controller to limit the output current of the regulator when the current value detected by the current detector exceeds a third preset current value set to be lower than the second preset current value.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A and 3B are timing charts showing an operation at startup of the power supply device;

DETAILED DESCRIPTION OF THE INVENTION

The invention will now be described by reference to the preferred embodiments. This does not intend to limit the scope of the present invention, but to exemplify the invention.

Figure 1:
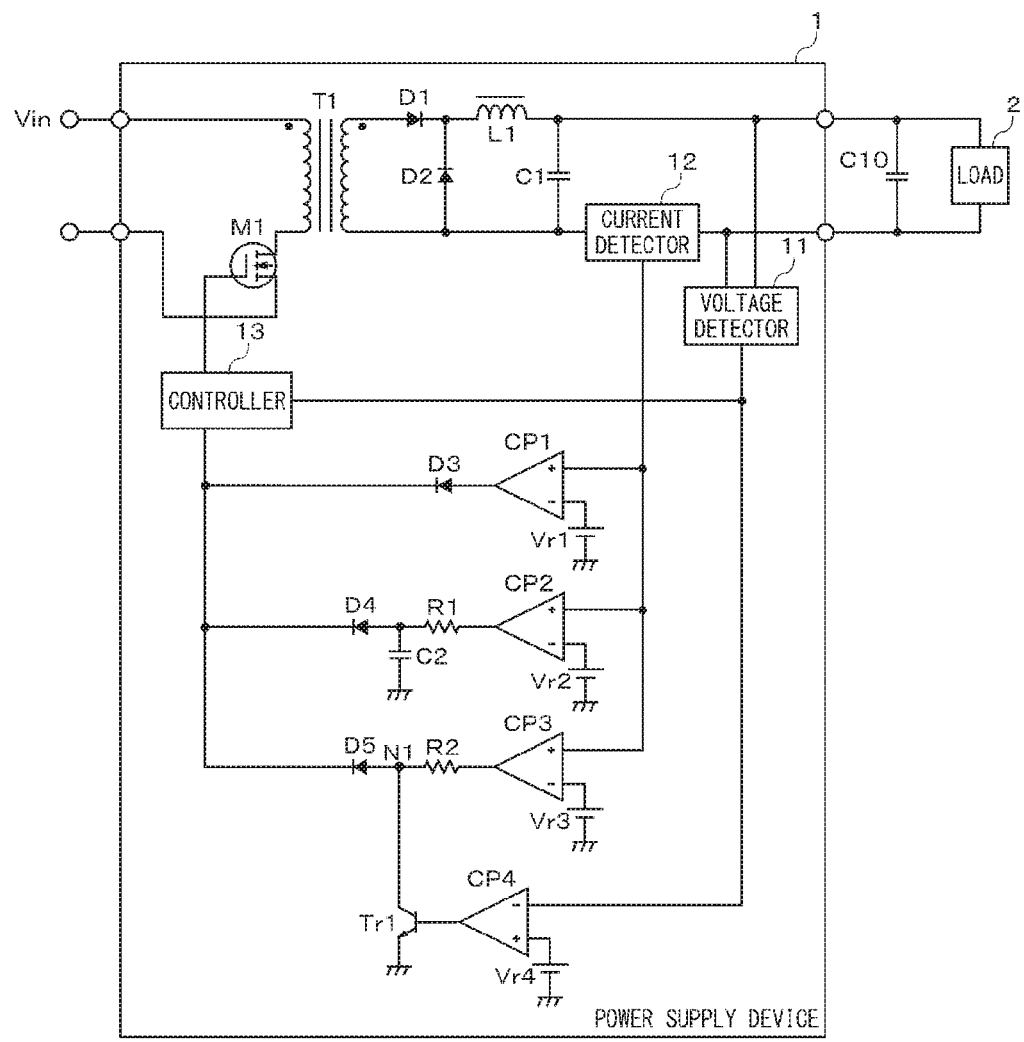
FIG. 1 shows a power supply device according to embodiment 1 of the present invention.

FIG. 1 shows a power supply device 1 according to embodiment 1 of the present invention. The power supply device 1 is a DC-DC converter that supplies power to a load 2. Hereinafter, a DC motor such as a linear motor is assumed as the load 2 in this specification. Generally, a large-capacitance capacitor C10 is externally coupled in parallel to the DC motor in order to secure a large starting torque in the DC motor. By charting the large-capacitance capacitor C10 at startup, an instantaneous power at startup is secured.

The power supply device 1 includes a switching element M1, a transformer T1, a first diode D1, a second diode D2, an inductor L1, and a first capacitor C1, as basic features of a switching regulator. A DC input voltage Vin is applied to the primary winding of the transformer T1. The switching element M1 is inserted between the input source of the input voltage Vin and the primary winding of the transformer T1 and conducts/interrupts electricity between the input source and the primary winding. FIG. 1 illustrates an example of using an N-channel MOSFET as the switching element M1. Other switching elements such as an IGBT, may be used. The output voltage at the secondary winding of the transformer T1 is rectified by a rectifying circuit formed by the first diode D1 and the second diode D2, and smoothed by a smoothing circuit formed by the inductor L1 and the first capacitor C1.

FIG. 1 illustrates a forward DC-DC converter as an example of the switching regulator. Other types of switching regulator may be used. For example, a fly-back DC-DC converter, a push-pull DC-DC converter, a bridge DC-DC converter, or the like may be used. A non-linear switching regulator, in which a transformer is not used, may be used.

A voltage detector 11 detects an output voltage of the switching regulator. The voltage detector 11 can be formed by, for example, an error amplifier. The voltage detector 11 outputs the detected output voltage to a controller 13. A current detector 12 detects an output current of the switching regulator. The current detector 12 can be formed by, for example, a shunt resistor and an error amplifier. The current detector 12 outputs a voltage corresponding to the output current of the switching regulator.

The controller 13 adaptively changes the duty ratio of a drive signal input to the control terminal (gate terminal in the case of a MOSFET) of the switching element M1 in accordance with the output voltage of the switching regulator detected by the voltage detector 11. This initiates feedback control that maintains a constant output voltage of the switching regulator. More specifically, when the output voltage of the switching regulator is lower than a target voltage, the duty ratio of the switching element M1 is raised, and, when the output voltage of the switching regulator is higher than the target voltage conversely, the duty ratio of the switching element M1 is lowered.

In embodiment 1, three types of excess current protections circuits, i.e., an excess current protection circuit for peak, an excess current protection circuit for average, and an excess current protection circuit for startup, are provided. In the following description, it is assumed that the rated current of the switching regulator is 10 A and the rated peak current is 28 A. Large instantaneous power may be used to drive a motor. The switching regulator is configured to withstand a peak current of a short duration. In the following description, it is assumed that a first excess current setup value that activates the excess current protection circuit for peak is 30 A, a second excess current setup value that activates the excess current protection circuit for average is 11 A, and a third excess current setup value that activates the excess current protection circuit for startup is 6 A.

Referring to FIG. 1, the excess current protection circuit for peak is implemented by a first comparator CP1. The first comparator CP1 is formed by an operational amplifier. The output voltage of current detector 12 is input to the non-inverting input terminal of the operational amplifier, and a first reference voltage Vr1 corresponding to the first excess current setup value is input to the inverting input terminal. The first comparator CP1 outputs a high level when the voltage corresponding to the output current of the switching regulator input from the current detector 12 exceeds the first reference voltage Vr1 and outputs a low level when the first reference voltage Vr1 is not exceeded. The output voltage of the first comparator CP1 is output to the controller 13 via the third diode D3.

When the output voltage of the first comparator CP1 is at a high level, the controller 13 lowers the duty ratio of the drive signal input to the control terminal of the switching element M1 to limit the output current of the switching regulator. Thus, the excess current protection circuit for peak directs the controller 13 to limit the output current of the switching regulator when the output current value of the switching regulator exceeds the first excess current setup value.

The excess current protection circuit for average is implemented by a second comparator CP" and a low pass filter. The second comparator CP2 is formed by an operational amplifier. The output voltage of current detector 12 is input to the non-inverting input terminal of the operational amplifier, and a second reference voltage Vr2 corresponding to the second excess current setup value is input to the inverting input terminal. The second comparator CP2 outputs a high level when the voltage corresponding to the output current of the switching regulator input from the current detector 12 exceeds the second reference voltage Vr2 and outputs a low level when the second reference voltage Vr2 is not exceeded.

A low pass filter formed by a first resistor R1 and a second capacitor C2 is connected to the output terminal of the second comparator CP2. The low pass filter integrates the output voltage of the second comparator CP2. The output voltage of the second comparator CP2 integrated by the low pass filter is output to the controller 13 via a fourth diode D4.

If the power supply device 1 drives the DC motor with a pulse current, the current during an ON period of the pulse current is permitted to exceed the second excess current setup value, if the average current per a unit period of time is equal to or lower than the second excess current setup value. This design parameter is approximated by setting the time constant of the low pass filter and the second reference voltage Vr2 optimally. If the current during an ON period of the pulse current exceeds the first excess current setup value, the current is limited by the excess current protection circuit for peak.

When the output voltage of the second comparator CP2, with the characteristics of a low pass filter added, is at a high level, the controller 13 lowers the duty ratio of the drive signal input to the control terminal of the switching element M1 so as to limit the output current of the switching regulator. Thus, the excess current protection circuit for average directs the controller 13 to limit the output current of the switching regulator when the average value of the output current value of the switching regulator over a predetermined period of time exceeds the second excess current setup value.

The excess current protection circuit for startup is implemented by a third comparator CP3, a second resistor R2, a transistor Tr1, and a fourth comparator CP4. The third comparator CP3 is formed by an operational amplifier. The output voltage of current detector 12 is input to the non-inverting input terminal of the operational amplifier, and a third reference voltage Vr3 corresponding to the third excess current setup value is input to the inverting input terminal.

The third comparator CP3 outputs a high level when the voltage corresponding to the output current of the switching regulator input from the current detector 12 exceeds the third reference voltage Vr3 and outputs a low level when the third reference voltage Vr3 is not exceeded.

The output terminal of the third comparator CP3 is connected to a first node N1 via the second resistor R2. The transistor Tr1 is inserted between the first node N1 and a nonsignificant reference potential (ground potential in the case of FIG. 1). The transistor Tr1 is merely one example of the switch. Any of other semiconductor switches may be used. Still alternatively, a relay may be used.

The fourth comparator CP4 is formed by an operation amplifier. The output voltage of the voltage detector 11 is input to the non-inverting input terminal of the operational amplifier, and a fourth reference voltage Vr4 corresponding to a low voltage setup value is input to the inverting input terminal. The low voltage setup value is defined to be approximately 75-95% of a predefined drive voltage of the load 2. The output terminal of the fourth comparator CP4 is connected to the base terminal of the transistor Tr1.

The fourth comparator CP4 outputs a high level when the output voltage of the switching regulator supplied to the load 2 exceeds the fourth reference voltage Vr4 and outputs a low level when the fourth reference voltage Vr4 is not exceeded. While the output voltage of the fourth comparator CP4 is at a low level, the transistor Tr1 is turned off and the first node N1 is disconnected from the ground. When the output voltage of the fourth comparator CP4 makes a transition to a high level, the transistor Tr1 is turned on and the potential of the first node N1 is fixed to the ground potential.

Thus, the transistor Tr1 and the fourth comparator CP4 function as an Under Voltage Alarm (UVA). In other words, the output voltage of the third comparator CP3 is validated until the load voltage reaches the low voltage setup value. The output voltage of the third comparator CP3 is latched to the ground potential and is invalidated when the low voltage setup value is exceeded.

If the output voltage of the switching regulator is equal to or lower than the low voltage setup value, the output voltage of the first comparator CP1 is directly output to the controller 13 via a fifth diode D5. If the output voltage of the switching regulator exceeds the low voltage setup value, a low level continues to be output to the controller 13. Thus, the excess current protection circuit for startup directs the controller 13 to limit the output current of the switching regulator when the output current value of the switching regulator exceeds the third excess current setup value at startup. After startup, the excess current protection circuit for startup is latched and deactivated.

Figure 2:
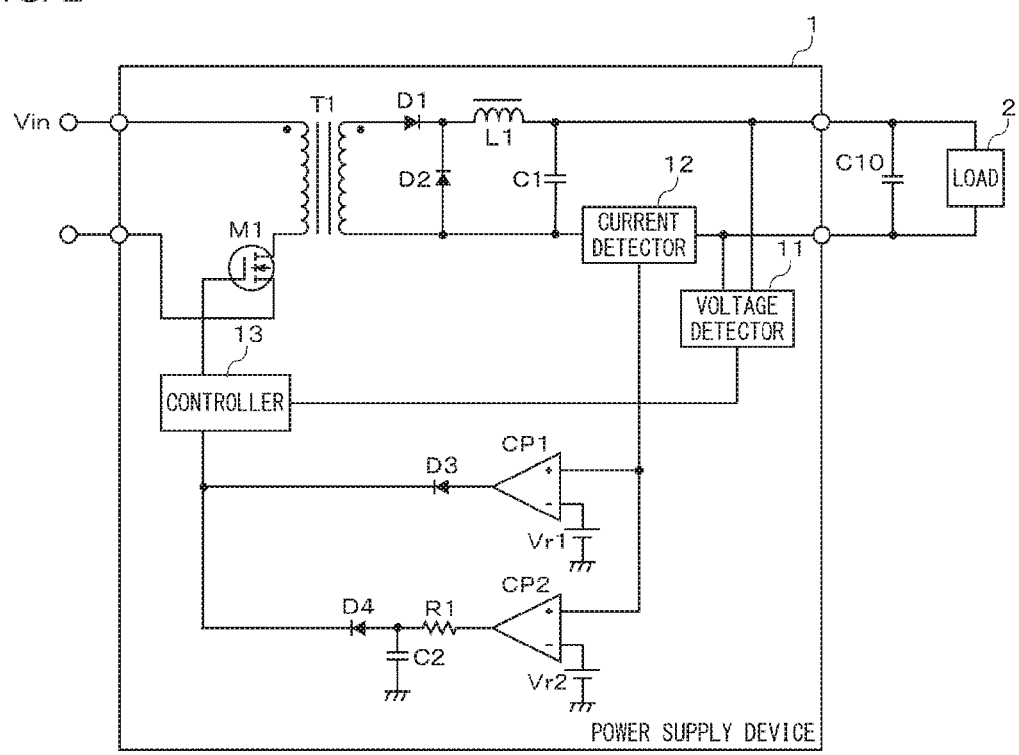
FIG. 2 shows a power supply device according to a comparative example.

FIG. 2 shows the power supply device 1 according to a comparative example. Unlike the power supply device 1 according to embodiment 1, the power supply device 1 according to the comparative example shown in FIG. 2 is of a configuration in which the excess current protection circuit for startup is not provided. More specifically, the power supply device 1 according to the comparative example is not provided with the third comparator CP3, the second resistor R2, the transistor Tr1, the fourth comparator CP4, and the fifth diode D5.

FIGS. 3A and 3B are timing charts showing the operation of the power supply device 1 at startup. FIG. 3A is a timing chart showing the transition of an output current I and an output voltage V of the power supply device 1 according to the comparative example shown in FIG. 2 at startup. FIG. 3A is a timing chart showing the transition of an output current I and an output voltage V of the power supply device 1 according to embodiment 1 shown in FIG. 1 at startup.

Referring to FIG. 3A, the large-capacitance capacitor C10 is started to be charged by the output current I of the power supply device 1, when the power supply device 1 is started. When the output current I reaches a first excess current setup value I1p, the output current I is limited to be equal to or lower than the first excess current setup value I1p by the excess current protection circuit for peak while the output voltage V is increased. The excess current protection circuit for peak operates within a temporally defined range (e.g., within 100 ms). Beyond a defined time, the output voltage V is increased while the excess current protection circuit for average limits the current I to be equal to or lower than a second excess current setup value I2a.

When the large-capacitance capacitor C10 is completely charged and the output voltage V reaches the predefined drive voltage Vd of the load 2, the output current I gradually drops. In this startup sequence, the larger the capacitance of the large-capacitance capacitor C10, the longer the time of excess current operation at startup, resulting in a heavy load on the power supply device 1. For example, a temperature alarm (not shown) may be raised while the large-capacitance capacitor C10 is being charged, with the result that the operation of the power supply device 1 may be suspended.

By way of contrast, the excess current protection circuit for startup that functions only at startup is added in embodiment 1. At startup, the excess current protection circuit for startup charges the large-capacitance capacitor C10 with a constant current (CC charging) lower than the rated current value.

Referring to FIG. 3B, the large-capacitance capacitor C10 is started to be charged with the output current I of the power supply device 1 when the power supply device 1 is started. When the output current I reaches a third excess current setup value I3s, the large-capacitance capacitor C10 is charged by the excess current protection circuit for startup with a constant current of the third excess current setup value I3s. When the output voltage V reaches the low voltage setup value Vu, the excess current protection circuit for startup is latched and deactivated. When the excess current protection circuit for startup is latched and deactivated, the output voltage V is increased while the excess current protection circuit for average limits the output current I to be equal or lower than the second excess current setup value I2a.

When the large-capacitance capacitor C10 is completely charged and the output voltage V reaches the predefined drive voltage Vd of the load 2, the output current I gradually drops. In this startup sequence, 75-95% of the capacitance of the large-capacitance capacitor C10 is charged with a constant current of the third excess current setup value I3s lower than the rated current. Therefore, the time required for charging is slightly extended as compared to the case of FIG. 3A but the load on the power supply device 1 is significantly reduced.

As described above, according to embodiment 1, the stress in the power supply device 1 at startup is reduced by providing the excess current protection circuit for startup in addition to the excess current protection circuit for peak and the excess current startup circuit for average. Therefore, suspension of the operation in the middle of startup due to a temperature alarm is avoided.

In the case of the load 2 that requires a large power, a plurality of power supply devices 1 may be connected in parallel for parallel operation. If the number of power supply devices 1 in operation is reduced due to a failure etc., the large-capacitance capacitor C10 connected in parallel to the load 2 will be charged by a smaller number of power supply devices 1. In this case, the output current is lowered so that the time required to charge the large-capacitance capacitor C10 will be extended. When the power supply device 1 according to the comparative example is used, the time in which a current exceeding the rated current flows is longer so that the stress on the power supply device 1 in operation is larger. When the power supply device 1 according to embodiment 1 is used, on the other hand, reduction in the number of devices in operation is addressed by extension of the time for charging, so that an increase in the stress on the power supply device 1 in operation is reduced.

Figure 4:
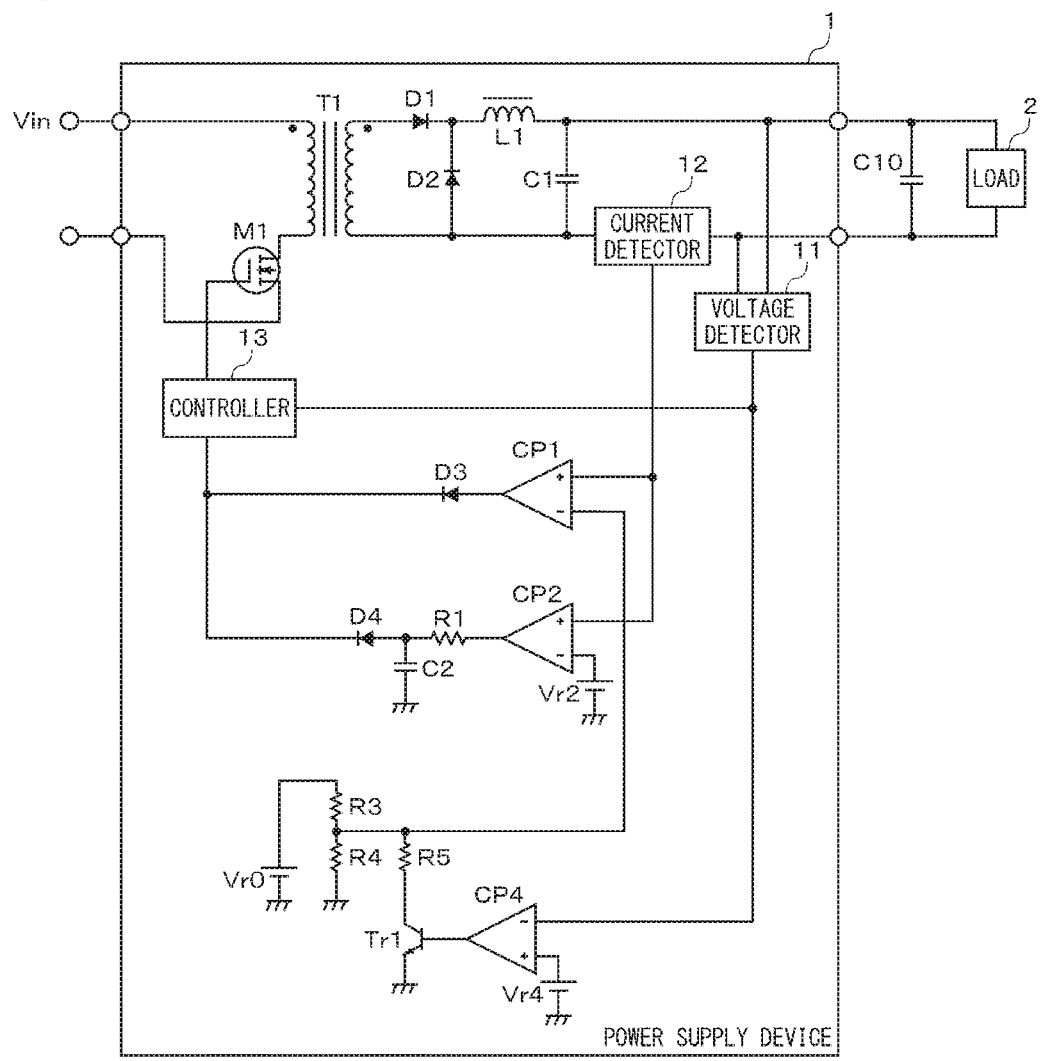
FIG. 4 shows a power supply device according to embodiment 2 of the present invention.

FIG. 4 shows the power supply device 1 according to embodiment 2 of the present invention. The power supply device 1 according to embodiment 2 is configured such that one comparator is commonly used in the excess current protection circuit for peak and in the excess current protection circuit for startup. As shown in FIG. 4, the first comparator CP1 is commonly used in the excess current protection circuit for peak and in the excess current protection circuit for startup. In the power supply device 1 shown in FIG. 4, the third comparator CP3, the second resistor R2, and the fifth diode D5 shown in FIG. 1 are omitted.

The voltage at a second node N2 is input to the inverting input terminal of the first comparator CP1. The voltage at the second node N2 is generated by viding a reference voltage Vr0 higher than the first reference voltage Vr1 by a third resistor R3 and a fourth resistor R4. The divided voltage from the third resistor R3 and the fourth resistor R4 correspond to the first reference voltage Vr1. In embodiment 2, the transistor Tr1 is inserted between the second node N2, instead of the first node N1, and the ground. A fifth resistor R5 is inserted between the second node N2 and the transistor Tr1.

In embodiment 2, the output voltage of the voltage detector 11 is input to the inverting input terminal of the fourth comparator CP4, and a fourth reference voltage Vr4 corresponding to the low voltage setup value is input to the non-inverting input terminal. The fourth comparator CP4 outputs a low level when the output voltage of the switching regulator supplied to the load 2 exceeds the fourth reference voltage Vr4 and outputs a high level when the fourth reference voltage Vr4 is not exceeded. While the output voltage of the fourth comparator CP4 is at a high level, the transistor Tr1 is turned on, a current is conducted between the second node N2 and the ground, and the fifth resistor R5 is validated. The divided voltage from the third resistor R3, the fourth resistor R4, and the fifth resistor R5 corresponds to the third reference voltage Vr3. Therefore, the third reference voltage Vr3 is input to the inverting input terminal of the first comparator CP1 while the output voltage of the switching regulator is equal to or lower than the low voltage setup value. In essence, the first comparator CP1 functions as the excess current protection circuit for startup.

When the output voltage of the fourth comparator CP4 makes a transition to a low level, the transistor Tr1 is turned off, the second node N2 is disconnected from the ground, and the fifth resistor R5 is invalidated. This increases the potential at the second node N2, and the first reference voltage Vr1 is input to the inverting input terminal of the first comparator CP1. Thus, while the output voltage of the switching regulator exceeds the low voltage setup value, the first reference voltage Vr1 is input to the inverting input terminal of the first comparator CP1. In essence, the first comparator CP1 functions as the excess current protection circuit for peak.

When the output voltage of the switching regulator is equal to or lower than the low voltage setup value, the first comparator CP1 outputs a result of comparing the voltage corresponding to the output current value of the switching regulator with the third reference voltage Vr3 to the controller 13. When the output voltage of the switching regulator exceeds the low voltage setup value, the first comparator CP1 outputs a result of comparing the voltage corresponding to the output current value of the switching regulator with the first reference voltage Vr1 to the controller 13.

As described above, embodiment 2 provides the same advantage as embodiment 1. As compared to embodiment 1, the number of operational amplifiers used for excess current protection is reduced.

Figure 5:
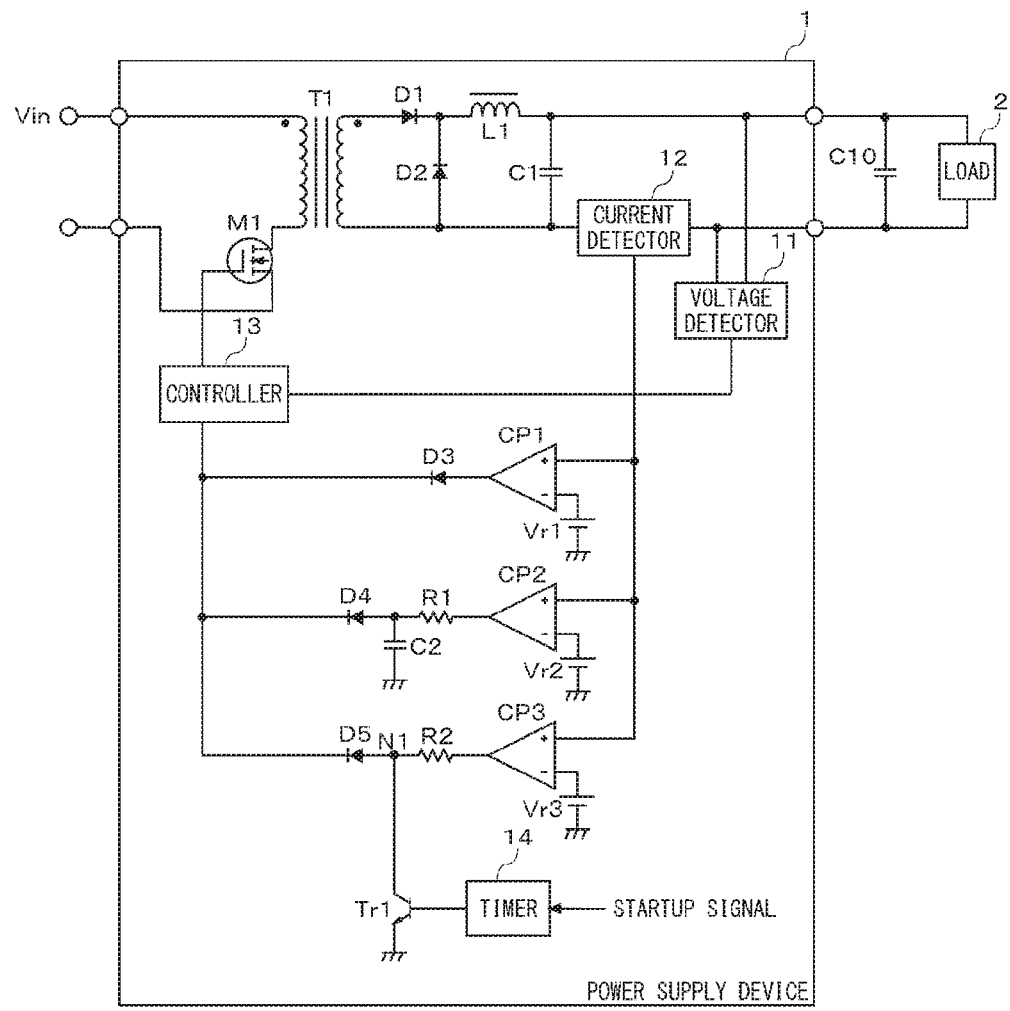
FIG. 5 shows a power supply device according to embodiment 3 of the present invention.

FIG. 5 shows the power supply device 1 according to embodiment 3 of the present invention. The excess current protection circuit for startup in the power supply device 1 according to embodiment 3 is invalidated when a preset time has elapsed since startup and not when the load voltage exceeds the low voltage setup value. The power supply device 1 shown in FIG. 5 is provided with a timer 14 in place of the fourth comparator CP4 shown in FIG. 1. The timer 14 turns the transistor Tr1 on when a preset time elapses since a startup signal is input. The preset time is set to correspond to the time required to charge the large-capacitance capacitor C10.

As described above, embodiment 3 provides the same advantage as embodiments 1 and 2. Embodiment 3 is useful in a case where the capacitance of the large-capacitance capacitor C10 for use is fixed. Meanwhile, embodiments 1 and 2 use voltage as a trigger instead of time so that excess current protection functions at startup usefully regardless of the capacitance of the large-capacitance capacitor C10. Therefore, the power supply device 1 is configured to be highly versatile.

Described above is an explanation based on embodiment 1-3. The embodiments are intended to be illustrative only and it will be obvious to those skilled in the art that various modifications to constituting elements and processes could be developed and that such modifications are also within the scope of the present invention.

In embodiments 1-3 described above, an example is given of setting the first excess current setup value (30 A) to about 1.07 times the rated peak current value (28 A). In connection with this, the first excess current setup value may be a value near the rated peak current value and may be within about ±10% of the rated peak current value. In embodiments 1-3 described above, an example is given of setting the second excess current setup value (11 A) to be 1.1 times the rated current value (10 A). In connection with this, the second excess current setup value may be a value near the rated current value and may be within about ±20% of the rated current value.

In the description above, an example is given of applying three stages of excess current protection to the switching regulator, but the protection can also be applied to a linear regulator.

What is claimed is:

1. A power supply device with excess current protection, comprising:
a regulator that supplies power to a load;
a controller that controls a switching element included in the regulator;
a current detector that detects an output current of the regulator;
a first excess current protector that directs the controller to limit the output current of the regulator when a current value detected by the current detector exceeds a first preset current value set to be higher than a rated current value of the power supply device;
a second excess current protector that directs the controller to limit the output current of the regulator when an average value of the current value detected by the current detector over a predetermined period of time exceeds a second preset current value set to correspond to the rated current value; and a third excess current protector that directs the controller to limit the output current of the regulator when the current value detected by the current detector exceeds a third preset current value set to be lower than the second preset current value.

2. The power supply device with excess current protection according to claim 1, wherein
the third excess current protector is invalidated when a voltage of the load exceeds a preset voltage value after the power supply device is started.

3. The power supply device with excess current protection according to claim 2, wherein
the third excess current protector includes:
a comparator that outputs a result of comparing a voltage corresponding to the current value detected by the current detector with a reference voltage corresponding to the third preset current value to the controller; and
a switch inserted between an output terminal of the comparator and a nonsignificant reference potential, wherein
the switch is turned on when the voltage of the load exceeds the preset voltage value.

4. The power supply device with excess current protection according to claim 2, wherein
the first and third excess current protectors include a common comparator, wherein
the comparator outputs a result of comparing a voltage corresponding to the current value detected by the current detector with a third reference voltage corresponding to the third preset current value to the controller when the voltage of the load is equal to or lower than the preset voltage value, and outputs a result of comparing the voltage corresponding to the current value detected by the current detector with a first reference voltage corresponding to the first preset current value to the controller when the voltage of the load exceeds the preset voltage value.

5. The power supply device with excess current protection according to claim 1, wherein
the third excess current protector is invalidated when a preset time elapses since the power supply device is started.

* * * * *